C. H. TURNER.
ATTACHMENT FOR SCALES.
APPLICATION FILED AUG. 29, 1916.

1,250,721.

Patented Dec. 18, 1917.

Inventor
C. H. Turner.

By John Louis Waters & Co.
Attorney

UNITED STATES PATENT OFFICE.

CHARLES H. TURNER, OF JACKSONVILLE, FLORIDA, ASSIGNOR OF ONE-HALF TO JOHN ADELBERGER, OF JACKSONVILLE, FLORIDA.

ATTACHMENT FOR SCALES.

1,250,721.  Specification of Letters Patent.  Patented Dec. 18, 1917.

Application filed August 29, 1916. Serial No. 117,449.

*To all whom it may concern:*

Be it known that I, CHARLES H. TURNER, a citizen of the United States, residing at Jacksonville, in the county of Duval and State of Florida, have invented certain useful Improvements in Attachments for Scales, of which the following is a specification, reference being had therein to the accompanying drawing.

This invention relates to improvements in attachments for scales, one object of the invention being the provision of a device of this character which may be connected to a spring rotating indicator scale so that a computing dial and coöperating hand device may be attached thereto to convert such scales into a computing scale.

A further object of this invention is the provision of a device of this character which is readily attached in position and which is thoroughly efficient and practical in use, as well as simple and inexpensive.

In the accompanying drawings:—

Figures 1, 2:
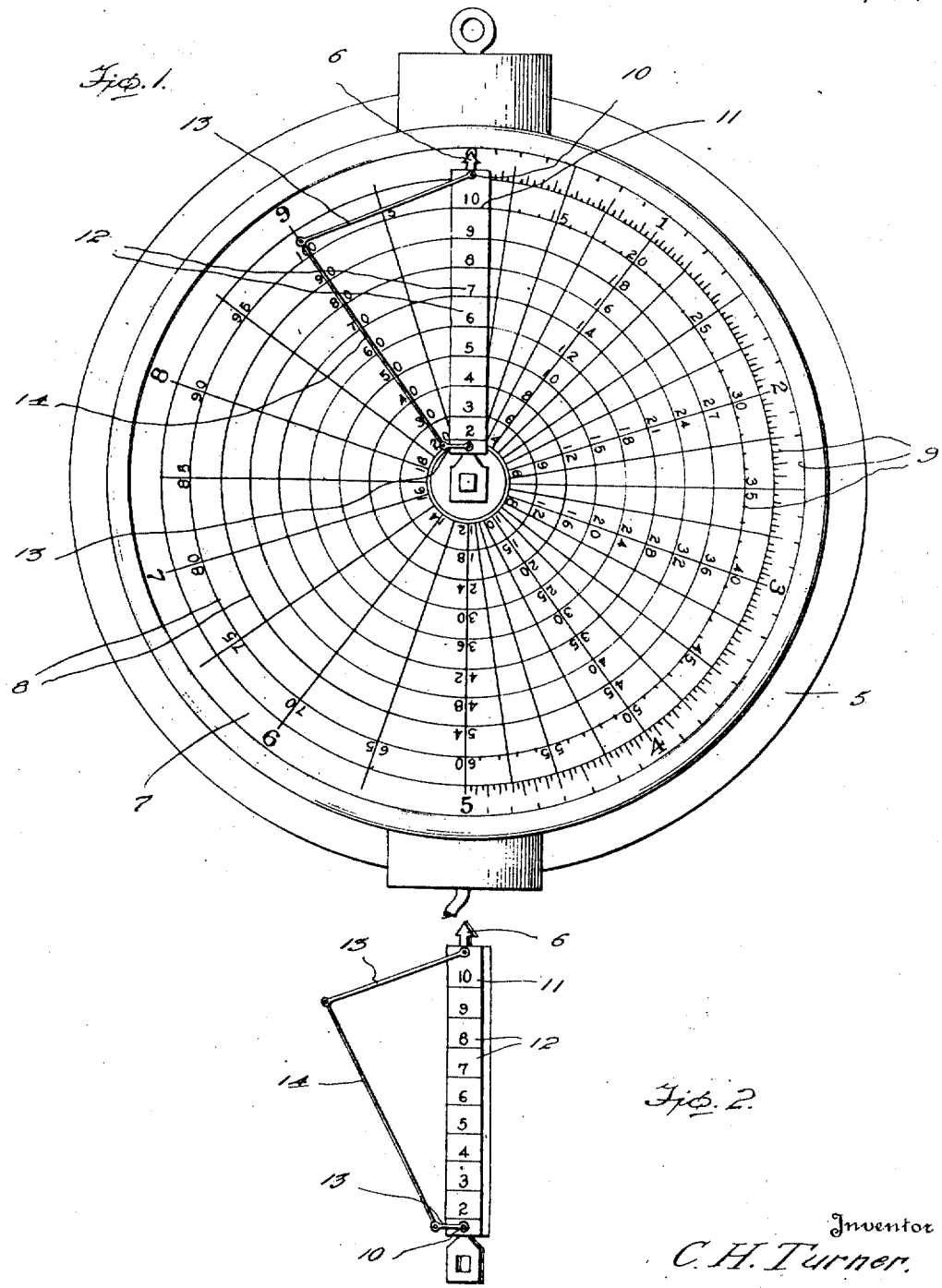
Figure 1 is a plan view of the complete attachment in place upon a scale.
Fig. 2 is a detail view of the hand carried device *per se*.

Referring to the drawings, the numeral 5 designates the circular dial usually supplied with spring scales, while 6 indicates the indicating pointer or hand.

Fixedly or removably connected to the face of the dial and concentrically within the outer graduations thereof is a disk 7 which has marked thereon a plurality of concentric circles 8 which in turn each carry its particular graduations 9.

Detachably connected by means of screws 10 to the pointer or hand 6 is a strip 11 of any desired material, which has formed thereon a plurality of spaces 12 carrying numeral indications, as shown, and corresponding to the respective indications between the circles 8 and the outer circle of the disk 7.

Supported by the plate 11 by means of the arms 13 is a bar 14 which is an auxiliary indicator, the purpose of which will presently appear.

Where so desired, the disk 7 may be formed integral with the main dial 5 by merely printing the concentric rings 8 thereon with their respective graduations.

The numerals carried by the plate 11 indicate the price per pound at which the goods are sold, while the figures carried by the circles 8 are where the sum totals are printed, the indicators 14 at the left and carried by the plate 11 at the ends thereof indicating upon the respective circles 8 the sum total of the cost of the article weighed.

For example, suppose an article is being weighed, and the indicator or pointer 6 has passed the full distance around the dial 5 and stops at the point exactly as indicated in Fig. 1.

This would indicate exactly ten pounds, and to ascertain the cost thereof at 10¢ per pound, the outer member 10 on the plate 11 is noted and the auxiliary indicator 14 would indicate in the space corresponding thereto that the price is one dollar.

If the price of the article was six cents per pound, the indication of the price would be opposite the number 6 on the plate and to the point on which the indicator 14 rests, or sixty cents.

What I claim as new is:—

1. In a device of the class described, in combination, a circular dial, provided with a series of concentric circular lines inscribed thereupon, said dial being also inscribed at similar intervals apart upon its marginal edge with consecutive numerals indicating pounds and having a radial line inscribed opposite each numeral, said last-named lines radiating from the center of the dial, and an indicating member mounted upon said dial, said indicating member consisting of a bar like strip having a portion pivoted centrally upon said dial so as to swing thereupon, a pointer carried by the outer end of said strip adapted to move across said numerals, said strip being divided by a number of lines adapted to register with the circular lines of the dial in any position of said strip upon the latter, said strip also provided with a bar forming an auxiliary indicator and having a pair of arms, one arm being longer than the other and both arms being secured at their inner ends upon the opposite ends of said strip and their outer ends being secured to said indicating bar so as to dispose the latter in angular relation to said strip at an angle equal to the angle made by any two of the said radial lines so that when said strip is upon one of said radial lines said indicating arm is upon another one of said radial lines, a consecutive series of numerals being inscribed upon each of said radial lines opposite each circular line intersecting the same, a series of numerals being inscribed upon said strip opposite the lines thereof, each series of numerals upon the circumference of each circular line being arranged in consecutive order being multiples of the numerals on the strip opposite the lines on the strip registering with these circular lines.

2. In a device of the class described, in combination, a dial, a rotatable shaft centrally of the dial, and having a polygonal head, a rectangular strip having a portion formed with a polygonal opening through which said head projects, a pointer forming an extension of said strip, a pair of long and short arms, secured at their inner ends at alined points upon the opposite ends of the said strip, the shorter arm being secured at right angles to the strip and the longer arm at an angle to the strip; and an indicating bar having its opposite ends secured respectively to the other ends of said arms.

In testimony whereof I affix my signature.

CHAS. H. TURNER.